United States Patent [19]
Manaka et al.

[11] Patent Number: 6,082,101
[45] Date of Patent: Jul. 4, 2000

[54] EXHAUST GAS PURIFIER FOR ENGINES

[75] Inventors: Toshio Manaka, Hitachinaka; Takashi Shiraishi, Ibaraki-ken, both of Japan

[73] Assignee: Hitachi, Ltd., Tokyo, Japan

[21] Appl. No.: 08/901,796

[22] Filed: Jul. 28, 1997

[30] Foreign Application Priority Data

Jul. 26, 1996 [JP] Japan ..................... 8-197591

[51] Int. Cl.[7] .................................................. F01N 3/00
[52] U.S. Cl. ................................ 60/285; 60/277; 60/286
[58] Field of Search ........................... 60/276, 277, 285, 60/286, 274, 302

[56] References Cited

U.S. PATENT DOCUMENTS

| 5,377,484 | 1/1995 | Shimizu | 60/276 |
| 5,522,219 | 6/1996 | Orzel et al. | 60/274 |
| 5,591,905 | 1/1997 | Fujimoto et al. | 73/118.1 |
| 5,865,026 | 2/1999 | Davey et al. | 60/274 |

FOREIGN PATENT DOCUMENTS

| 39 18 601A1 | 12/1990 | Germany . |
| 43 08 894A1 | 9/1994 | Germany . |
| 43 22 524A1 | 2/1995 | Germany . |
| 44 36 754A1 | 4/1995 | Germany . |
| 43 02 779C2 | 5/1995 | Germany . |
| 43 44 137A1 | 6/1995 | Germany . |
| 197 32 167 | 6/1999 | Germany . |
| 5-106493 | 4/1993 | Japan . |
| 5-106494 | 4/1993 | Japan . |
| 5-98945 | 4/1993 | Japan . |
| 5-98946 | 4/1993 | Japan . |
| 5-98947 | 4/1993 | Japan . |
| 5-98948 | 4/1993 | Japan . |
| 5-163989 | 6/1993 | Japan . |
| 5-180043 | 7/1993 | Japan . |
| 6-173661 | 6/1994 | Japan . |
| 7-71232 | 3/1995 | Japan . |

*Primary Examiner*—Thomas Denion
*Assistant Examiner*—Binh Tran
*Attorney, Agent, or Firm*—Evenson, McKeown, Edwards & Lenahan, P.L.L.C.

[57] ABSTRACT

An exhaust gas purifier equipped with a catalyst converter including an early-activation catalyst converter and a pre-catalyst converter for purifying harmful exhaust gas discharged form an engine evaluates a characteristic of the exhaust gas purification rate of the catalyst converter from the cooled condition to the warmed condition of a catalyst to diagnose a deterioration of the early-activation function of the catalytic converter. The purifier compares a rising part of the evaluated characteristic of the exhaust gas purification rate with a rising part of a reference characteristic and judges that the early-activation catalyst converter is deteriorated if a difference between these rising parts is beyond a predetermined value, and compares a steady state part of the evaluated characteristic of the exhaust gas purification rate with a steady state part of the reference characteristic and judges that the pre-catalyst converter is deteriorated if a difference between these steady state parts is beyond a predetermined value.

6 Claims, 6 Drawing Sheets

EXHAUST GAS PURIFIER FOR ENGINES

BACKGROUND OF THE INVENTION

The present invention relates to an exhaust gas purifier equipped with a catalyst converter for purifying harmful exhaust gas discharged from engines and specifically to a diagnostic technique for the deterioration of catalyst thereof.

With intensifying regulation of harmful components (e.g., HC, CO, NOx) in exhaust gas discharged from automobile engines or the like, various diagnostic techniques for the deterioration of catalyst used for the purification of exhaust gas have been proposed.

Representative of catalytic converters is a three-way catalyst for simultaneously processing the reduction of NOx and the oxidation of HC and CO. Further, in order to enhance the purification of exhaust gas, proposed is a catalytic converter in which not only the main catalytic converter but also the pre-catalytic converter is provided.

As conventional representative diagnostic techniques for catalytic converter there are known methods, with exhaust sensors, e.g., $O_2$ sensors, provided upstream and downstream of a catalytic converter installed in an exhaust pipe, for example, as described in Japanese Patent Laid-Open No. 5-248227 for diagnosing the deterioration of a catalytic converter from the correlation between the upstream and the downstream $O_2$ sensors, such as e.g., the measured value of time from the output inversion of the upstream $O_2$ sensor to the output inversion of the downstream $O_2$ sensor when inverting the air fuel ratio from lean to rich or from rich to lean, and the output ratio, response ratio or phase ratio of the upstream and the downstream sensors.

With attention paid to the capability of oxygen storage in possession of a catalyst, every of these methods performs a deterioration judgment of the catalyst by quantitatively determining the capability of oxygen storage. With higher purification rate of exhaust gas by a catalyst (higher oxygen storage), the correlation coefficient of the output of the downstream (post-catalytic) exhaust sensor to that of the upstream (pre-catalytic) exhaust sensor becomes low, the response is delayed and the output of the downstream exhaust sensor decreases. The deterioration judgment of the catalyst is carried out, based on such characteristics.

Besides, when the catalyst is new, the oxygen storage is saturated (100% activation of a catalyst) near 300° C., whereas with an advance in heat deterioration, the capability of oxygen storage does not yet reach a state of 100% activation in the range of 300° C. to 550° C. and may become a state of 100% activation at a higher temperature than this range because the capability of oxygen storage gradually falls (even this case has thus far been treated as a good catalytic converter in the conventional art). Accordingly an erroneous diagnosis is prevented by determining whether the catalyst is a good one or a deteriorated one, corresponding to a temperature condition at the time of diagnosis.

Japanese Patent Laid-Open No. 7-71232 proposes a diagnostic apparatus for vehicle exhaust gas purifier with a plurality of catalyst bodies arranged in a series from the upstream of an exhaust passage of an engine, in which exhaust gas sensors are provided upstream of an upstream most catalyst boy, among a plurality of catalyst bodies, and a downstream most catalyst body. When predetermined diagnostic conditions (e.g., the engine running state lies in the diagnosis range established by the engine load and the number of engine revolution, the warming-up is completed, or the vehicle is running at a constant speed) is carried out, the purification rate of a specific catalyst body is obtained from the total purification rate of the exhaust gas purifier and from the respective purification rates for the catalyst bodies except the specific catalyst body evaluated from the respective detection signals from the respective exhaust gas sensors and the deterioration condition of the catalytic converter is judged by comparing the purification rate of the specific catalyst body with a reference value.

Incidentally, other diagnostic techniques of a catalyst with attention paid to the capability of oxygen storage are described in Japanese Patent Laid-Open No. 5-98945, Japanese Patent Laid-Open No. 5-98946, Japanese Patent Laid-Open No. 5-98947, Japanese Patent Laid-Open No. 5-98948, Japanese Patent Laid-Open No. 5-98949, Japanese Patent Laid-Open No. 5-106493, Japanese Patent Laid-Open No. 5-106494, Japanese Patent Laid-Open No. 5-163989, Japanese Patent Laid-Open No. 5-180043, Japanese Patent Laid-Open No. 6-173661 and so on.

The conventional diagnostic techniques for the deterioration of catalytic converters for exhaust gas purification intend to judge the deterioration from the purification rate after the activation of a catalyst, i.e., the quantitative determination of the saturated oxygen storage capability.

Meanwhile, from the viewpoint of environmental protection, the requirements for regulating the exhaust gas become recently stringent. In order to overcome such stringent requirements, proposed is a catalytic converter in which in addition to a main catalytic converter, an early-activation catalytic converter is provided to accelerate the activation as well as a pre-catalytic converter is provided to secure the purification efficiency after the activation.

The early-activation catalytic converter basically employs a three-way catalytic converter, like as the main catalytic converter and the pre-catalytic converter. However, in order to shorten a time period to reach the activation temperature from the engine start, the early-activation catalytic converter may be provided with an electric heater, may include an accelerating catalyst for oxidation reaction, or may have a small heat capacity and be placed closer to the engine. The temperature of the early-activation catalytic converter reaches the activation temperature thereof before the temperatures of the main catalytic converter and the pre-catalytic converter reach the activation temperature. Accordingly, the early-activation catalytic converter can perform the exhaust gas purification short time after the engine start.

Under such circumstances, it is also required to diagnose the early-activation function of a catalytic converter (in particular, early-activation catalytic converter), but the existent diagnostic technique for catalysts cannot cope with this requirement. This is because the conventional diagnostic technique for catalysts diagnoses the deterioration of a catalyst from the exhaust gas purification rate after the catalyst's temperature reaches the activation temperature, and includes no technique for monitoring how much time has passed since the engine start till the catalyst is activated.

The present invention is made in view of these points and its first purpose is to provide an engine exhaust gas purifier provided with an early-activation catalytic converter in addition to the main catalytic converter, which purifier is adapted to a stringent regulating for exhaust gas.

The second purpose of the present invention is to enable the symptoms of a pre-catalytic and an early-activation converters to be distinguished and identified separately in deterioration diagnosis when the pre-catalytic and the early-activation catalytic converters are provided as auxiliary catalytic converters at the preceding step for the main catalytic converter.

SUMMARY OF THE INVENTION

To attain the above-mentioned first purpose, the present invention fundamentally provide the following engine exhaust gas purifier, namely:

An engine exhaust gas purifier equipped with a catalytic converter for the purification of exhaust gas comprising catalyst diagnosis means for judging the deterioration of a catalytic converter by comparing the rising (transient) characteristic of exhaust gas purification rate in the catalyst temperature with a reference rising (transient) characteristic therein.

To attain the second purpose, the present invention provides the following exhaust gas purifier, namely:

An engine exhaust gas purifier equipped with a main catalytic converter, and an auxiliary catalytic converter disposed in the preceding step of the main catalytic converter, which auxiliary catalytic converter including an early-activation catalytic converter for obtaining a rapid activation and a pre-catalytic converter for securing the purification efficiency after the activation, which purifier comprising: an exhaust gas sensor disposed at least downstream side of upstream and downstream sides of the auxiliary catalytic converter; means for detecting or estimating the temperature of the auxiliary catalytic converter; and catalyst diagnosis means for inputting the temperature information of the auxiliary catalytic converter and the data of the exhaust gas sensor, for evaluating the rising characteristic of the exhaust gas purification rate in the catalyst temperature and the steady state characteristic after the transient state, and for judging that the early-activation catalytic converter is deteriorated when a deviation between the rising characteristic and a reference rising characteristic beyond a predetermined amount and for judging that pre-catalytic converter is deteriorated when the steady state characteristic is below a predetermined value.

DESCRIPTION OF THE PREFERRED EMBODIMENTS

Embodiment of the present invention will be described hereinafter with referring to the accompanying drawing.

Figure 1:
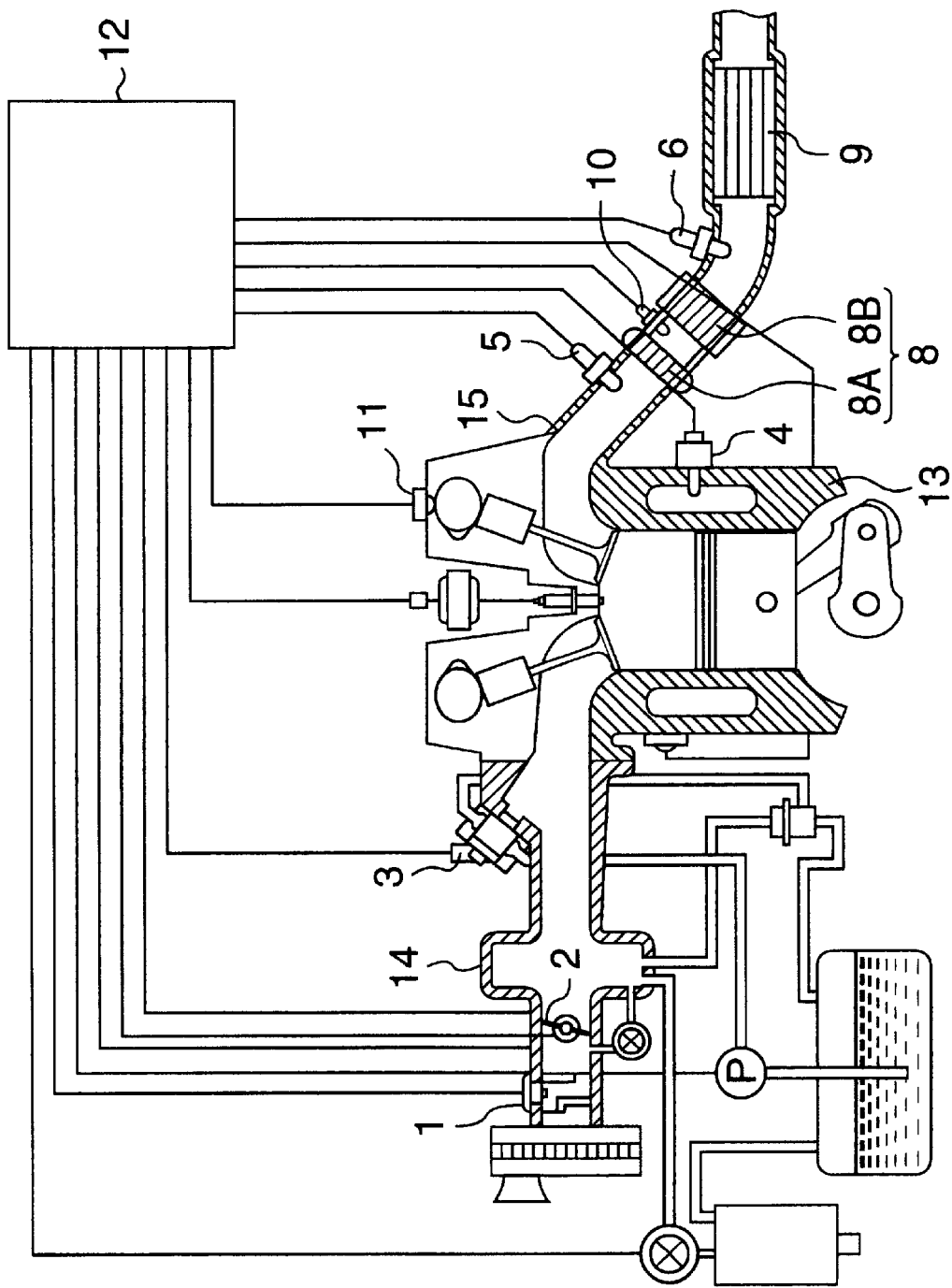
FIG. 1 is a structural drawing of an engine system to which the present invention is applicable.

In the engine control system of FIG. 1, the following signals are inputted into a control unit 12. Namely, the detection signals from an air flow rate sensor 1 and a throttle sensor 2 in an air suction system, detection signals of a rotation sensor 11 and a water temperature sensor 4 in an engine 13, detection signals of an exhaust sensor 5 (positioned upstream side of an auxiliary catalytic converter 8, referred to as pre-catalytic sensor hereinafter) and an exhaust sensor 6 (positioned downstream of an auxiliary catalytic converter 8, referred to as post-catalytic sensor hereinafter) in an exhaust system, and a detection signal of a catalyst temperature sensor 10. Air is supplied to the engine 13 through a suction passage 14 and exhaust gas is discharged through an exhaust gas passage 15.

The control unit 12 determines a flow rate of fuel to be supplied to the engine 13 on the basis of a signal from the air flow rate sensor 1 (engine-sucked air quantity Qa), a signal from the throttle sensor 2 (opening degree TH of a throttle valve), a signal from the water temperature sensor 4 (engine cooling water temperature TW), a signal from the pre-catalytic sensor 5 (air fuel ratio signal Gf) and a signal from the rotation sensor 11 (number N of engine rotation). The control unit 12 outputs a fuel feed signal corresponding to the determined flow rate of fuel to an injector 3.

The exhaust gas from the engine 13 is purified by the auxiliary catalytic converter 8 (the early-activation catalytic converter 8A and the pre-catalytic converter 8B) and the main catalytic converter 9. Incidentally, the catalytic converter is referred to simply as catalyst hereinafter.

The early-activation catalyst 8A has a catalyst composition similar to that of the pre-catalyst 8B and that of the main catalyst 9 (e.g., three-way catalyst). The catalyst 8A has a small heat capacity and is installed near the engine 13, so that the catalyst is warmed as fast as possible and the activation is accelerated even when the engine is started at a cooled down state, thereby hastening the purification of exhaust gas.

The early-activation catalyst 8A may be heated at the early stage by current or high-frequency wave or by using an oxidation reaction acceleration catalyst. The pre-catalyst 8B is a catalyst for securing the purification efficiency of a catalyst and purifies the harmful exhaust gas remaining unpurified with the early-activation catalyst 8A. Generally, because of smaller in size than a main catalyst 9, the early-activation catalyst 8A is heated comparatively speedily. The main catalyst 9 purifies the harmful exhaust gas remaining unpurified with the early-activation catalyst 8A and the pre-catalyst 8B.

The auxiliary catalyst 8 installed in front of the main catalyst 9 is composed of the early-activation catalyst 8A and a pre-catalyst 8B. In particular, the early-activation catalyst 8A can greatly decrease the discharge of harmful exhaust gas during engine cooling, and the exhaust gas regulation tightening ULEV in North America can be cleared. Incidentally, the combination of only the pre-catalyst 8B and the main catalyst 9 has difficulty in satisfying the exhaust gas regulation tightening ULEV.

In the provision of an early-activation catalyst 8A as described above, the need for diagnosing whether or not the early activation works normally is required to cope with a stringent exhaust gas regulation.

In the present example, in order to diagnose the early-activation catalyst 8A and the pre-catalyst 8B, exhaust gas sensors 5, 6 are disposed upstream and downstream of the auxiliary catalyst 8 (upstream side of the early-activation catalyst 8A and downstream side of the pre-catalyst 8B in the exhaust passage), respectively. The early-activation catalyst 8A is diagnosed in connection with the degeneration mode A in FIG. 3 and the pre-catalyst 8B is diagnosed in connection with the degeneration mode B shown in FIG. 3.

Incidentally, since the main catalyst 9 is disposed remote from the engine, the main catalyst 9 is often exposed to a purified exhaust gas of relatively low temperature and accordingly is hardly deteriorated.

Figure 3:
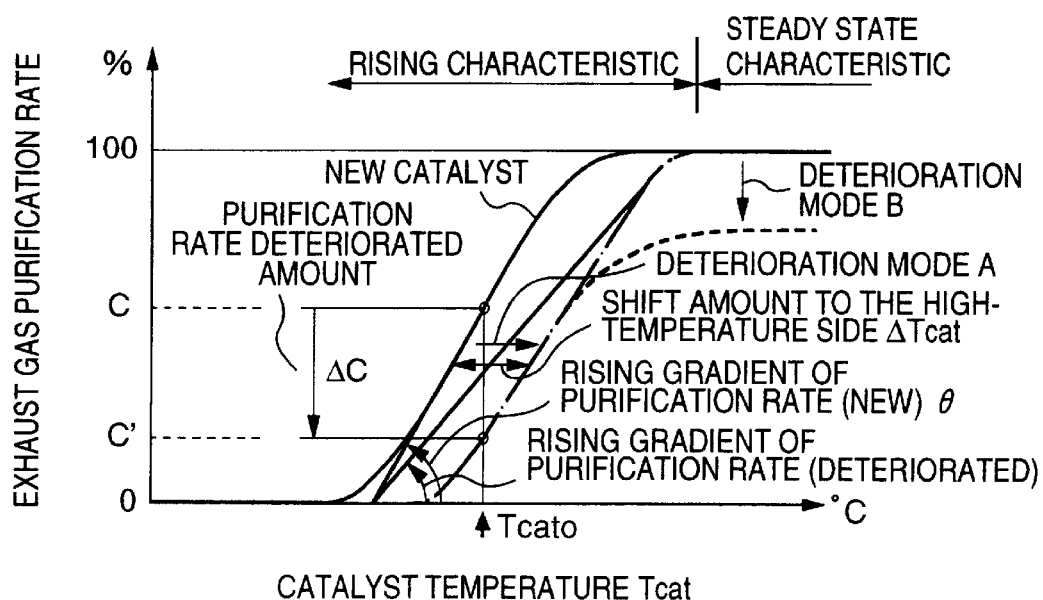
FIG. 3 is an illustrative chart showing the exhaust gas purification rate characteristic.

Here, by referring to FIG. 3, the deterioration modes A and B of a catalyst is described.

With a progress of deterioration, the oxygen storage capability of the catalyst lowers, so that the rising characteristic of the exhaust gas purification rate in the catalyst temperature Tcat shifts to the high-temperature side (deterioration mode A) or the total purification rate in the steady state characteristic after the rising lowers (deterioration mode B).

Figure 4:
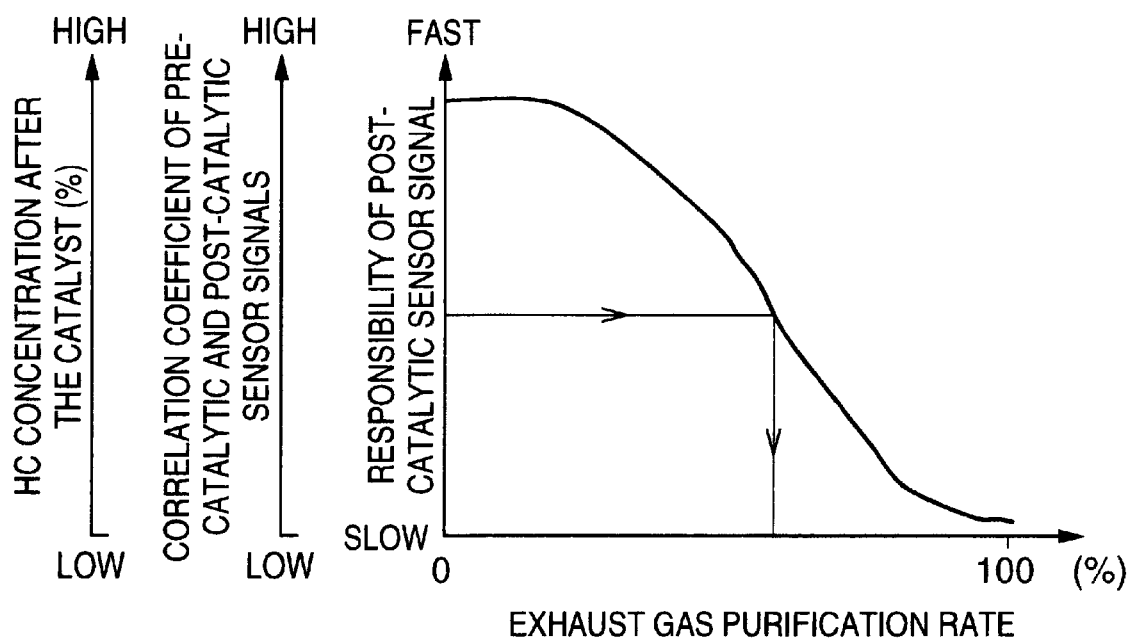
FIG. 4 is an illustrative chart showing the relation between the exhaust gas purification rate and the correlation coefficient of pre-catalytic and post-catalytic exhaust gas sensor signals.

FIG. 4 shows phenomena that can be found from a signal from the post-catalytic sensor 6. The higher the exhaust gas purification rate becomes (the higher the oxygen storage capability is), the lower the unburned hydrocarbon concentration (HC concentration) downstream side of the catalyst is and the lower the signal correlation coefficient between the pre- and the post-catalytic sensors 5 and 6 of the catalyst is. Further, the signal response of the post-catalytic sensor 6 is delayed. Thus, by monitoring these, the exhaust gas purification rate can be calculated.

For example, a case where the exhaust gas purification rate is calculated from the correlation coefficient between output signals Gf and Gr of the pre-catalytic and the post-catalytic exhaust sensors 5 and 6 will be described.

Figure 5:
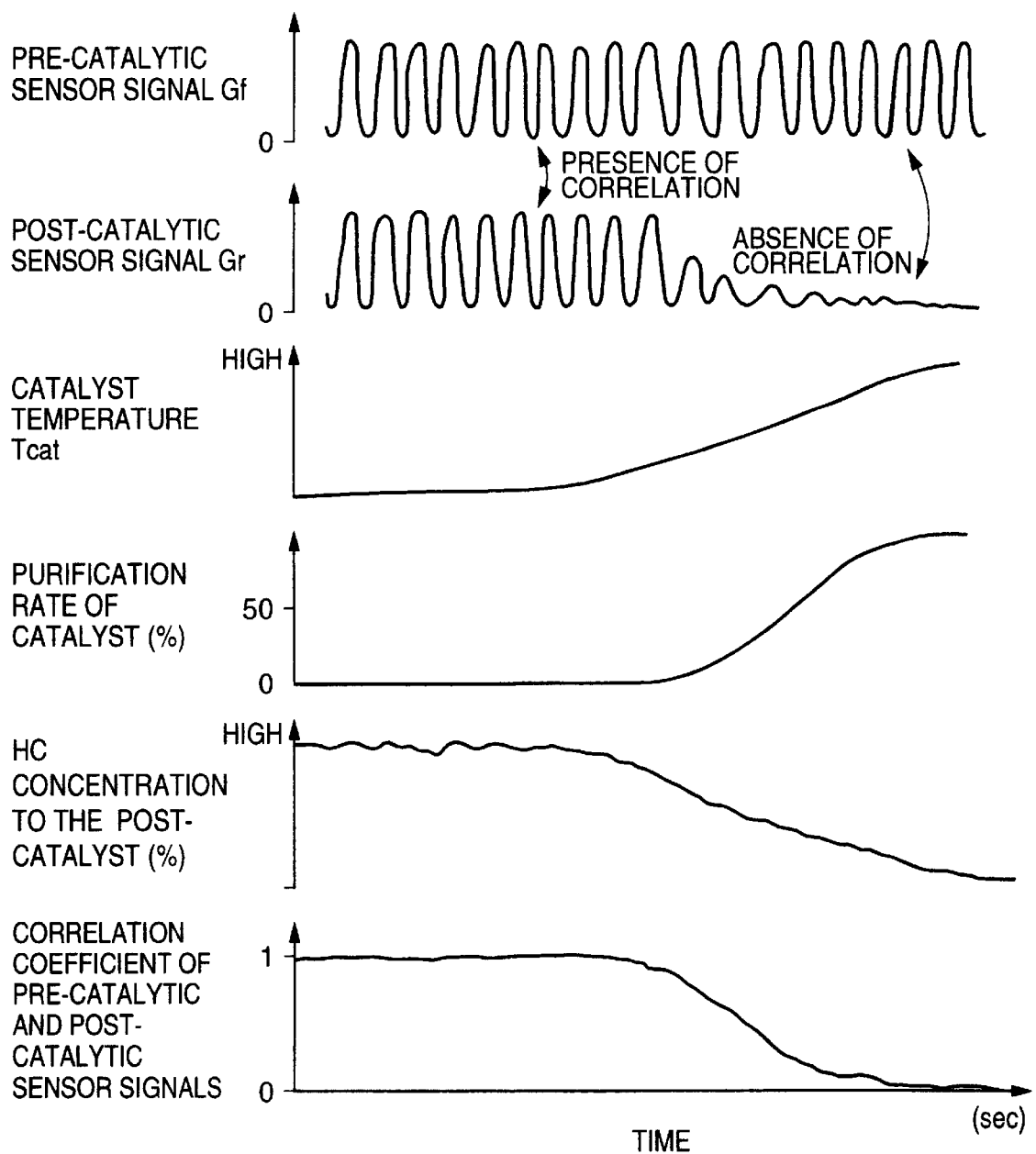
FIG. 5 is an illustrative chart showing changing of pre-catalytic and post-catalytic exhaust gas sensor signals as well as catalyst temperature, catalyst purification rate, post-catalyst HC concentration and sensor signal correlation, in connection with time elapse.

As shown in FIG. 5, the air-fuel ratio control of an engine is feedback-controlled in accordance with an output signal Gf of the pre-catalytic exhaust sensor 5. Due to the air-fuel ratio feedback control, the amount of fuel supplied to the engine is overshot and undershot a target one repeatedly and then the signal Gf from the pre-catalytic exhaust sensor 5 fluctuates periodically.

On the other hand, an output signal Gr from the post-catalytic exhaust sensor 6 fluctuates in the same wave form as with an output signal Gf of the pre-catalysis exhaust sensor 5 at first. However, with rising catalyst temperature, the catalyst purification rate increases and consequently the fluctuation becomes small. This is because, with increasing purification rate, the oxygen storage effect of the catalyst increases and the response of a signal Gr of the post catalytic exhaust sensor 6 becomes slow. Thus, the purification rate characteristics of FIG. 3 can be evaluated from the relation between the correlation coefficient between the pre-catalytic and the post-catalytic exhaust sensors' signals Gf and Gr, and the catalyst temperature Tcat.

The purification rate characteristics (rising characteristic and steady state characteristic) of new auxiliary catalytic converter 8 (including an early-activation catalyst 8A and a pre-catalyst 8B) are previously evaluated (FIG. 3) and stored as a reference rising characteristic and a steady state characteristic into the control unit 12.

The rising and the steady state characteristics of the auxiliary catalytic converter 8 changing with time are calculated from the relation between the correlation coefficient between the pre-catalytic and the post-catalytic exhaust sensors' signals Gf and Gr and the catalyst temperature Tcat and the calculated values (monitor values) are stored. Comparison of these monitor characteristics (both of the rising and steady state characteristics of the auxiliary catalytic converter 8 to be monitored) with the reference ones can reveal whether the deterioration is a mode A one or a mode B one.

In case of the mode A deterioration, the deterioration of the catalytic converter 8 is mainly caused by the deterioration of the early-activation catalyst 8A while in case of the mode B deterioration, the deterioration of the catalytic converter 8 is mainly caused by the deterioration of the pre-catalyst 8B.

In this example, by using the control unit 12, diagnosis on the deterioration modes A and B is carried out as follows.

Figure 2:
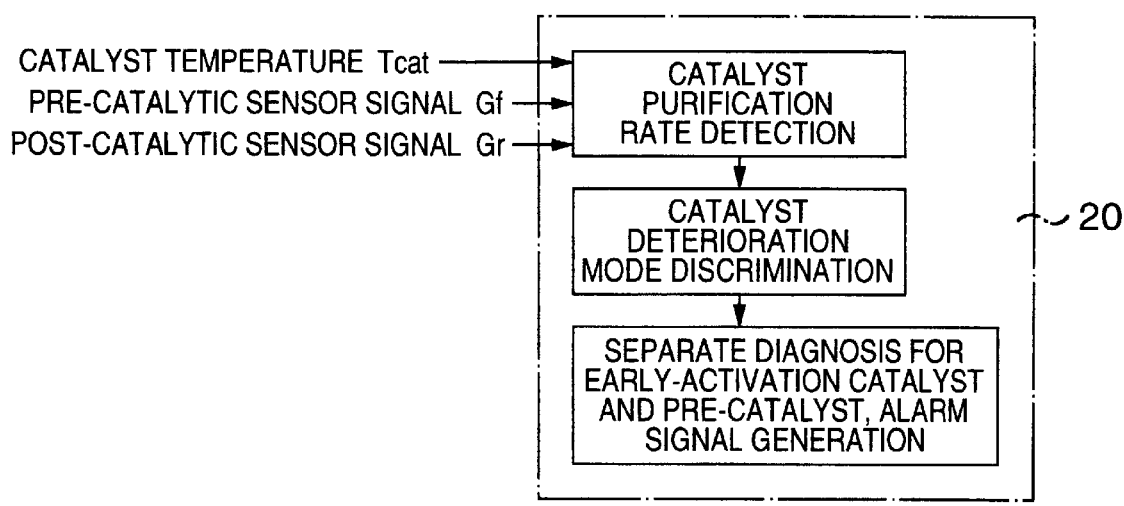
FIG. 2 is a block diagram showing one embodiment of exhaust gas purifier according to the present invention.

The control unit 12 includes an operation part which constitutes a catalyst diagnosis means 20 (FIG. 2). The catalyst diagnosis means 20 includes an exhaust gas purification rate detection function, a catalyst deterioration mode discrimination function and a catalyst diagnosis/alarm signal generation function.

That is, the catalyst diagnosis means 20 receives the pre-catalytic exhaust sensor's signal Gf, the post-catalytic exhaust sensor signal's signal Gr and the catalyst temperature Tcat signal and evaluates the exhaust gas purification rate characteristic of a catalyst as shown in FIG. 3 from the change of Tcat and the correlation data between Gf and Gr.

Next, from the evaluated exhaust gas purification rate characteristic, it is judged whether or not there is the deterioration of the rising characteristic of the early-activation catalyst 8A (deterioration mode A) and/or the deterioration of the steady state characteristic of the pre-catalyst 8B (deterioration mode B).

Finally, the deterioration of the rising characteristic of the early-activation catalyst 8A (the deterioration mode A) and of the steady state characteristic of the pre-catalyst 8B (the deterioration mode B) are compared with the corresponding reference characteristics, respectively. If the deteriorated quantity $\Delta A$ (e.g., shift quantity $\Delta Tcat$ to the high-temperature side of FIG. 3) of the deterioration mode A is beyond a predetermined quantity, it is judged that the early-activation catalyst 8A is deteriorated, while if the deteriorated quantity $\Delta B$ of the deterioration mode B is beyond a predetermined quantity, it is judged that the pre-catalyst 8B is deteriorated. The control unit 12 stores the results of judgments, and generates an alarm signal if the catalyst 8A and/or 8B is required to be replaced with new one. Thus, according to the present invention, by using the common exhaust gas sensors 5 and 6, it can be discriminated which of the early-activation catalyst 8A and the pre-catalyst 8B is out of order. Besides, the replacement of the faulty catalyst alone is possible.

In place of catalyst temperature Tcat. the temperature estimated from the sucked air quantity Qa, the fuel feed quantity, the time elapsed from the engine start, etc. may be employed. When the early-activation catalyst 8A is heated with electric current or high-frequency wave, the temperature may be estimated from the integrated value of power quantity thereof. Besides, in place of the estimated value thereof, data used for the evaluation of the estimated value may be directly employed.

Figure 6:
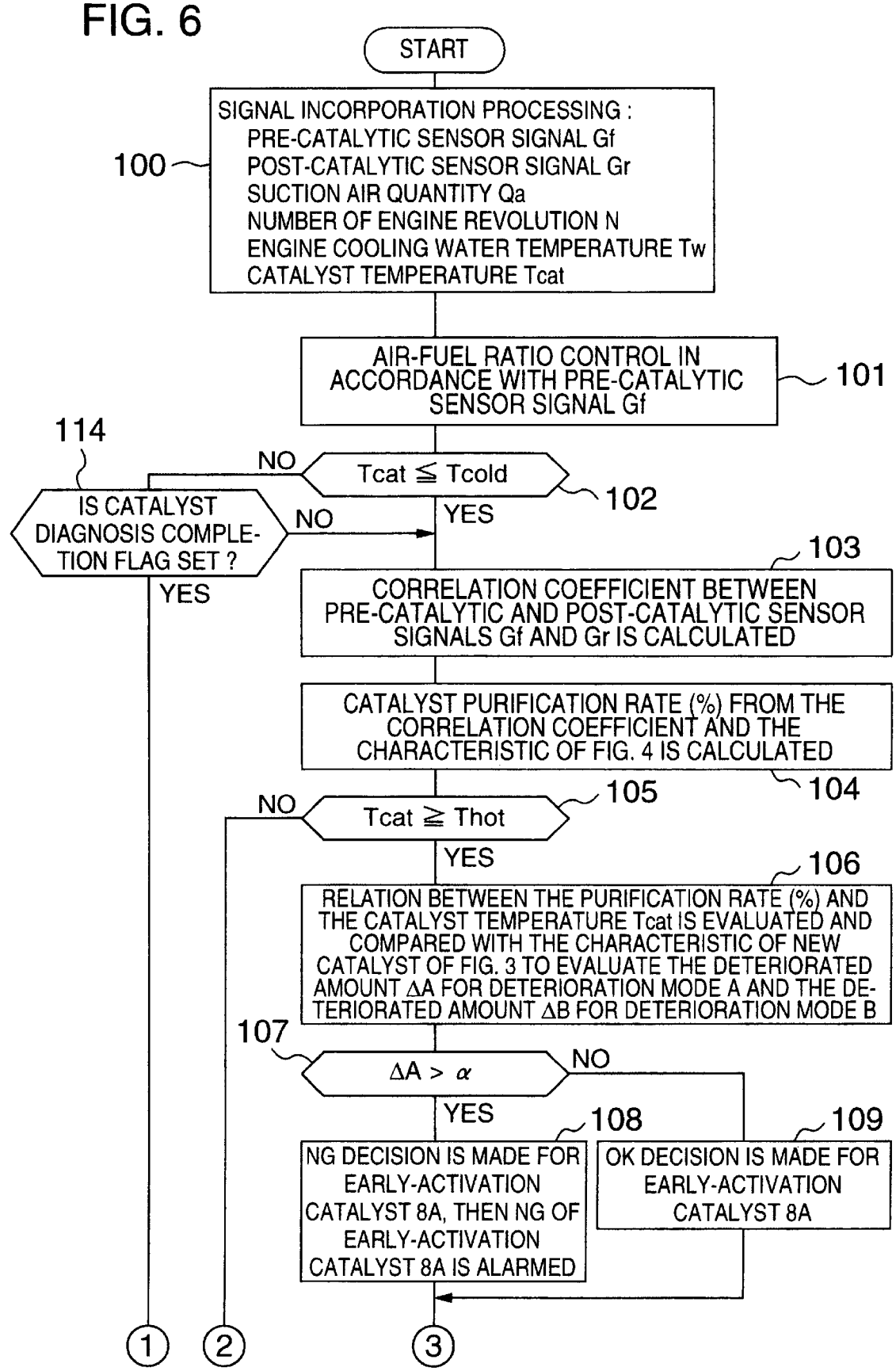
FIG. 6 is a flowchart showing a part of a catalyst deterioration diagnosis according to the present embodiment.
Figure 7:
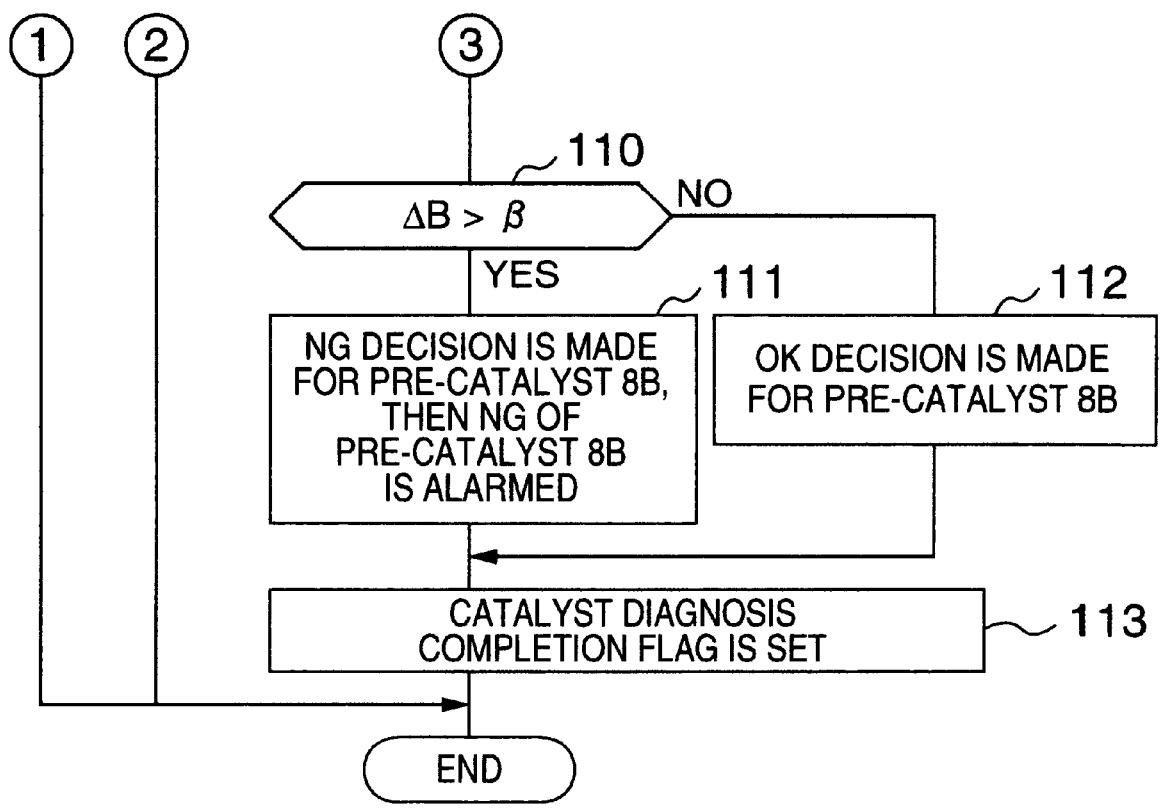
FIG. 7 is a flowchart showing a rest of the diagnosis.

The process of the catalyst diagnosis according to this embodiment is described hereinafter with referring to the flowcharts in FIGS. 6 and 7. This process is periodically repeated.

First, at the step 100, the control unit 12 reads the suction air quantity Qa to be sucked into the engine, the engine cooling water temperature TW, the pre-catalytic sensor's signal Gf, the post-catalytic sensor's signal Gr, the catalyst temperature Tcat and the number of engine revolutions N.

At the step 101, the air-fuel ratio control is performed in according with the pre-catalytic sensor's signal Gf.

At the step 102, if the catalyst (here, auxiliary catalyst 8 composed of the early-activation catalyst 8A and the pre-catalyst 8B) is in the cooled condition, namely the catalyst temperature Tcat is lower than Tcold (Tcold is a criterion for the cooling operation), the control procedure advances to the step 103. At the step 103, the correlation coefficient between signals Gf and Gr from the pre-catalytic and the post-catalytic sensors 5 and 6 is calculated.

At the step 104, the exhaust purification rate is calculated based on the correlation coefficient between Gf and Gr and the characteristic of FIG. 4. At the step 105, it is discriminated whether the auxiliary catalyst 8 is warmed upto a predetermined level. If warmed, namely the catalyst temperature Tcat is higher than Thot (Thot is a criterion for the warming operation), the relation between the exhaust gas purification rate and the catalyst temperature (exhaust purification rate characteristic of FIG. 3) is evaluated at the step 106. The deterioration quantity $\Delta A$ of the deterioration mode A ($\Delta A$ corresponds to the higher temperature side shift quantity $\Delta Tcat$) and the deterioration quantity $\Delta B$ of the deterioration mode B are calculated.

If it is found at the step 107 that the rising characteristic is shifted to higher temperature side by $\alpha$ or more (namely $\Delta A > \alpha$), it is decided at the step 108 that the early-activation catalyst 8A undergoes such a degree of deterioration to require the replacement (catalyst being faulty), and the decided result (NG decision) is stored and an alarm is issued. Otherwise, it is decided at the step 109 that the early-activation catalyst 8A works normally, and the decided result (OK decision) is stored.

Then, in step 110, it is determined whether or not the deterioration quantity $\Delta B$ in the deterioration mode B is beyond the predetermined value $\beta$. If $\Delta B > \beta$, it is decided at the step 111 that the pre-catalyst 8B is deteriorated, and the decided result (NG decision) is stored and an alarm is issued. Otherwise, it is decided at the step 112 that the pre-catalyst 8B works normally, and the decided result (OK decision) is stored. Finally the step 113 sets the catalyst diagnosis completion flag, and one cycle of diagnosis is completed. If it is determined at the step 102 that the catalyst is being warmed, the control procedure advances to the step 114. At the step 114 it is checked whether or not the catalyst diagnosis completion flag is set. If the flag is set, the process terminates. If the flag is not set, the process proceeds to the step 103 where the exhaust purification rate is calculated.

Incidentally, the diagnosis of deterioration at the step 108 may alternatively proceed as follows. The catalyst temperature Tcat0 serving as representative point of a reference rising characteristic (e.g., rising characteristic in the exhaust purification rate of a new catalyst) and the exhaust gas purification rate C at such temperature are settled. The purification rate C is compared with the exhaust gas purification rate C' of the catalyst monitored at Tcat0. It is decided that the early-activation catalyst 8A is deteriorated when the rate C' is lower by the predetermined value or more than the rate C or when the gradient $\theta'$ of the rising characteristic monitored becomes lower by a predetermined value or more than that $\theta$ of the reference rising characteristic.

The respective diagnosed results corresponding the deterioration modes A and B are stored in different distinguishable codes. Besides, a reference purification rate characteristic to temperature of a new catalyst as shown in FIG. 3 is stored in the control unit 12 and this enables the comparison with a monitored value of purification rate.

By using the responsibility of the post-catalytic sensor's signal Gf, unburned hydrocarbon concentration (HC concentration) of the exhaust gas from the catalyst or the like, the exhaust gas purification rate characteristic may be evaluated from the relation between this and the catalyst temperature, in place of the correlation coefficient between the pre-catalytic and the post-catalytic sensors' signals.

The above explanation has been made mainly towards the auxiliary catalytic converter 8. However, the diagnosis for catalytic converter due to the rising characteristic exhaust gas purification rate may be applicable to the main catalytic converter 9 with using exhaust gas sensors (not shown) disposed upstream and down-stream sides thereof. The same effects can be obtained.

This embodiment has the following meritorious advantages.

(1) The deterioration degree of the early-activation function of the early-activation catalyst 8A can be accurately diagnosed, thereby enabling a catalyst diagnosis adapted to the exhaust gas purifier that can cope with the future stringent exhaust gas regulations (e.g., North American exhaust gas regulations ULEV).

(2) Since diagnosis is made for both of the deterioration modes A and B shown in FIG. 3, the early-activation catalyst 8A and the pre-catalyst 8B are investigated independently, and then it is possible to replace the deteriorated part only.

(3) Diagnosis for these catalysts 8A and 8B can be made using common exhaust gas sensors.

According to the present invention, even in an engine exhaust gas purifier equipped with an early-activation catalytic converter (auxiliary catalytic converter) in addition to the main catalytic converter as adaptable for a stringent exhaust gas regulation, an exact catalyst deterioration diagnosis is enabled on the function of an early-activation catalyst.

Further, according to the present invention, when a pre-catalytic converter and the early-activation catalyst converter are disposed as auxiliary catalytic converter in upstream side of the main catalyst, the deterioration of those catalysts can be distinguished and identified, thereby enabling a proper replacement of a catalyst.

What is claimed is:

1. An engine exhaust gas purifier comprising:

a catalytic converter for purifying exhaust gas; and catalyst diagnosis means for discriminating the deterioration of the catalytic converter by comparing the rising characteristic of the exhaust gas purification rate of the catalytic converter relative to the catalyst temperature with a reference rising characteristic.

2. An engine exhaust gas purifier according to claim 1, characterized in that said catalyst diagnosis means is so set as to decide the catalyst to be replaced under the following conditions:

(1) the rising characteristic of exhaust gas purification rate of the catalytic converter diagnosed with relation to the catalyst temperature shifts to the high-temperature side from a reference rising characteristic beyond a predetermined value;

(2) in connection with the catalyst temperature Tcat0 serving as the representative point of a reference rising characteristic and a reference exhaust gas purification rate C at Tcat0, the exhaust gas purification rate C' of said catalytic converter diagnosed at Tcat0 is lower than said exhaust gas purification rate C beyond predetermined value; or (3) the gradient of the rising characteristic of exhaust gas purification rate of the catalytic converter diagnosed with relation to the temperature is lower than the gradient θ of the reference rising characteristic beyond a predetermined value.

3. An engine exhaust gas purifier according to claim 1, characterized in that the temperature of said catalytic converter diagnosed is estimated in accordance with any one of the quantity of air sucked in the engine, the quantity of fuel fed, the integrated value of either power or energy to be applied to the catalyst for accelerating the activation thereof, the time elapsed from the engine start, the number of engine revolution, the load and the engine cooling water temperature.

4. An engine exhaust gas purifier according to claim 1, further comprising means for issuing an alarm when the deterioration of the catalyst is detected.

5. An engine exhaust gas purifier comprising:

a main catalytic converter for purifying exhaust gas;

an auxiliary catalytic converter whose activation is accelerated; and catalyst diagnosis means for discriminating the deterioration of said auxiliary catalytic converter by comparing the rising characteristic of exhaust gas purification rate of said auxiliary catalytic converter in relation to the catalyst temperature with a reference rising characteristic.

6. An engine exhaust gas purifier comprising:

a main catalytic converter;

an auxiliary catalytic converter disposed upstream side of said main catalytic converter, said auxiliary catalytic converter including an early-activation catalytic converter whose activation is accelerated and a pre-catalytic converter for securing the purification after the activation;

an exhaust gas sensor disposed at least downstream side between upstream and downstream sides of said auxiliary catalytic converter;

means for detecting or estimating the temperature of said auxiliary catalytic converter; and catalyst diagnosis means for evaluating a rising characteristic of exhaust gas purifying rate of said auxiliary catalytic converter in relation to catalyst temperature and a steady state characteristic thereof after the rising, based on a temperature of said auxiliary catalytic converter and data from said exhaust gas sensor, and for comparing said rising characteristic with a reference rising characteristic and deciding that said early-activation catalytic converter is deteriorated if the resultant shift between these rising characteristics is beyond a predetermined value, and for comparing said steady state characteristic with a reference steady state characteristic and deciding that said pre-catalytic converter is deteriorated if the resultant shift between these steady state characteristics is beyond a predetermined value.

* * * * *